(12) United States Patent
Laflamme et al.

(10) Patent No.: US 6,376,739 B1
(45) Date of Patent: Apr. 23, 2002

(54) PROCESS FOR TREATING DAMP RESIDUES CONTAINING POLLUTING AND/OR TOXIC MATERIALS

(75) Inventors: Claude B. Laflamme, Cap-de-la-Madeleine; Raynald Labrecque, Shawinigan-Sud, both of (CA)

(73) Assignee: Hydro-Quebec (CA)

( * ) Notice: Subject to any disclaimer, the term of this patent is extended or adjusted under 35 U.S.C. 154(b) by 0 days.

(21) Appl. No.: 09/306,460

(22) Filed: May 7, 1999

(30) Foreign Application Priority Data

May 11, 1998 (CA) ............................................. 2237414

(51) Int. Cl.[7] ................................................ A62D 3/00
(52) U.S. Cl. ........................ 588/227; 588/210; 588/212; 204/157.15; 204/157.4
(58) Field of Search ................................. 588/205, 206, 588/207, 210, 212, 227; 204/157.4, 157.47, 157.5, 158.21, 157.15

(56) References Cited

U.S. PATENT DOCUMENTS

| | | | | |
|---|---|---|---|---|
| 4,438,706 A | * | 3/1984 | Boday et al. | ................ 110/238 |
| 4,870,911 A | | 10/1989 | Chang et al. | ................ 110/246 |
| 4,952,237 A | * | 8/1990 | Dube et al. | ................ 75/10.19 |
| 4,959,100 A | * | 9/1990 | Dube et al. | ................ 75/10.19 |
| 4,960,460 A | * | 10/1990 | Dube et al. | ................ 75/10.19 |
| 5,421,850 A | * | 6/1995 | Dube et al. | ................ 75/10.19 |
| 5,470,376 A | * | 11/1995 | Dube et al. | .................... 75/672 |
| 5,527,985 A | | 6/1996 | Funken et al. | ............... 588/227 |
| 5,637,127 A | * | 6/1997 | McLaughlin et al. | ...... 65/134.8 |
| 5,756,957 A | * | 5/1998 | Titus et al. | ............. 219/121.38 |
| 5,811,752 A | * | 9/1998 | Titus et al. | ............. 219/121.27 |
| 5,847,353 A | * | 12/1998 | Titus et al. | ............. 219/121.36 |

FOREIGN PATENT DOCUMENTS

| | | |
|---|---|---|
| WO | WO 97/22556 | 6/1997 |
| WO | WO 97/44096 | 11/1997 |

* cited by examiner

*Primary Examiner*—Steven P. Griffin
*Assistant Examiner*—Eileen E. Nave
(74) *Attorney, Agent, or Firm*—Katten Muchin Zavis

(57) ABSTRACT

A process for treating humid residues containing oxidizable organic mater. The process preferably comprises steps of: a) introducing the residues in a rotary furnace having a refractory lining and containing a thermo-transfer agent; b) heating the residues in admixture with the thermo-transfer agent at a temperature of at least 300° C. in the presence of chemically active species and UV radiation generated electrically, while rotating the furnace, so as to dry the residues and cause oxidation of the organic matter and formation of gases, the oxidation being catalyzed by the chemically active species and the UV radiation; and c) expelling the gases from the furnace. Such a process permits a low cost destruction of polluting material and/or oxidizable toxic material contained in the residues treated.

40 Claims, 2 Drawing Sheets

PROCESS FOR TREATING DAMP RESIDUES CONTAINING POLLUTING AND/OR TOXIC MATERIALS

FIELD OF THE INVENTION

Figure 1:
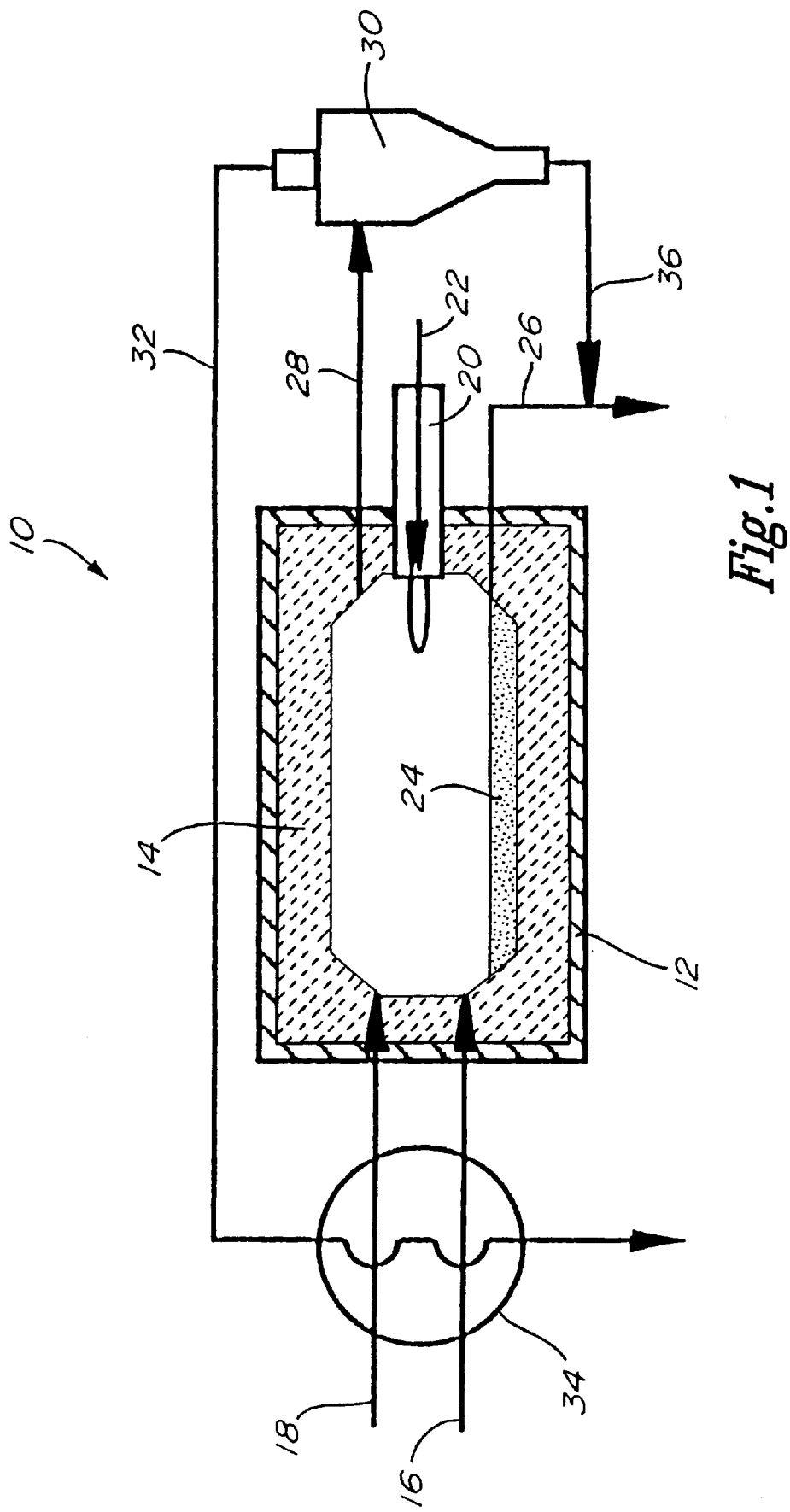

The invention is concerned with a process for the treatment of residues containing polluting and/or toxic materials. More specifically, the invention is directed to a process for treating residues containing oxidizable organic materials.

BACKGROUND OF THE INVENTION

Today's industries require practical solutions for the management of liquid and solid waste. For example, they must reduce the level of contamination of effluents before being released. Manuring and landfill of waste has become less popular, and incineration in large treating plants does not allow for the recovery of by-products. Liquid effluents and sludges generated by industries represent important concentrations of organic products as well as other oxidizable products. Each year, thousands of tons of organic materials and residues of various origins representing oxygen-demanding loads, are either treated or disposed of in landfills sites. However, an "on-site" treatment process represents an interesting alternative, especially if the process allows for the recovery of heat in the recycling of water and ashes produced.

The conventional approach, which comprises a drying step by evaporation, followed by an incineration step, is well known, but has limitations in terms of the energy yield. In particular, a lot of heat is lost from the air or the gases produced during the drying step. Also, many conventional incineration processes operate at high temperatures, for example around 1100° C. The sludge to be incinerated must therefore be substantially dry and have a high concentration of combustible materials to obtain a self-heating process. Otherwise, external heating with gas burners will be required.

Oxidation at 1100° C. requires a lot of energy to heat the gases and the water vapor. Therefore, incineration necessitates a heat source such as natural gas or fuel to initiate the reaction and maintenance thereof, as well as a high input of air that must be heated because the heat source already consumes a lot of oxygen. Furthermore, at such treatment temperature, salts and other volatile compounds escape from the incinerator. Also, the ashes, which contain alkali metal oxides, can form eutectics that are damageable to the refractory materials of the process or form melted heaps.

Landfilling of sludges requires large fields and is increasingly regulated because of long-term rigorous controls of liquid effluents. Landfill however has the advantage of being cheap and "apparently" offers a simple and quick solution to the disposal of sludges. However, the waste producer always remain responsible for any damage to the environment resulting from such landfilling.

Manuring also has the advantage of being cheap, and often represent an alternative less expensive than landfill because it is done on the surface. Liquids as well as sludges with high concentration of organic materials can easily be manured. However, the materials must not be toxic, nor bearing pathogenic microorganisms, and must have a relatively neutral pH. Also, the leaching waters should not contaminate rivers, lakes or ground water. And even if the materials to be manured possesses fertilising properties, the available manuring sites should be as close as possible to the production site to avoid high shipping costs because of the presence of high water volume therein. Manuring nearby residential areas is generally unpopular because of the various odours that may emanate from the site.

Airy ponds cause problems in terms of the management of the sludges as well as the space required for the installations. Such process generally uses compressors to supply air under pressure by injection. A lot of electrical energy is used, but no energy is recovered or recycled.

Composting is applicable only to sludges containing biodegradable materials. Such sludges must be dry enough to avoid secondary leaching. If the sludge contains too much water, the liquid or the sludge can be mixed with straw to ensure good absorption of the liquids and good product aeration, but the downside is that the volume of product to be treated, the storage requirement and the length of treatment are significantly increased. Again, the product cannot contain toxic materials that would impair the effect of the composting microorganisms, and to ensure that the material produced can be released into the environment without causing damages thereto.

A few damp oxidations technologies in super critical phase or in liquid/gas phase are available commercially. One of the major drawbacks of the implementation of these technologies is the high investment required. This is caused by the size and complexity of the equipment necessary. The super critical oxidation process could be economically attractive, but is useful only for low effluent flows if the latter are highly toxic.

The present invention has been designed to overcome the above limitations.

The invention relates to a process for treating residues containing oxidizable organic matter. The process of the invention comprises the steps of:

a) introducing the residues in a rotating furnace having a refractory lining and containing a thermo-transfer agent;

b) heating the residues in admixture with the thermo-transfer agent at a temperature of at least 300° C. in the presence of chemically active species and UV radiation generated electrically, while rotating the furnace, so as to dry the residues and cause oxidation of the organic matter and formation of gases, the organic matter oxidation being catalysed by the chemically active species and the UV radiation; and c) expelling the gases from the furnace.

The process of the present invention allows the drying and destruction by oxidation of the organic matter contained in the residues treated. It is based on the use of an electrically catalysed oxidation reactor, in particular for the treatment of effluents comprising high organic matter concentration, such as those found in the pulp and paper, textiles, paper de-inking, and food industries. Electricity is used to induce catalytic effects and transport phenomenons in combustion reactors.

Preferably, step b) is performed with a plasma torch. It is also possible to use electric arc system or an electrical discharge system comprised between two electrodes made of metals or graphite. These devices allow the heating of the mixture of the residues and the thermo-transfer agent at the desired temperature, and permit a generation of an ultraviolet-type radiation as well as chemically active species, such as free radicals, ions and excited species, which catalyzed the oxidation reactions. This is a rational use of electricity for the generation of phenomenons assisting transport mechanisms in chemical reactions taking place in an oxidation reactor. As a result, incineration process is performed in a smaller reactor in comparison with conventional incineration processes.

The process according to the invention aims at taking advantage of the calorific value of the oxidizable matter contained in the residues to be treated, to help the water evaporation process in the thermal destruction of the polluting materials. For sufficiently concentrated sludges (dryness higher than 10%), and if the calorific power of the oxidisable materials is sufficiently high, it will be possible to reach a self heating operation, and even exothermic, for the oxidation reactor. The expression "dryness" is defined as the mass proportion including the organic matter and the inorganic matter, excluding water, with respect to the total mass of the damp residues for diluted liquid effluents. The concentration of these matters can be increased through conventional standard techniques. These include the use of separation processes with membranes, such as inverted osmosis, ultrafiltration, nanofiltration and/or microfiltration, the latter being tangential flow filtration processes. Also included are the mechanical dehydration processes with or without flocculation/coagulation products, such as centrifuges, screw presses, seave filters, press filters, sedimentation processes, and the like. These dehydration processes may or may not be used in conjunction with separation processes using membranes as outlined above. The present process can be used for directly incinerating sludges obtained from a dehydration process, as well as concentrated sludges produced from membrane separation processes.

The oxidation is not affected by the pH of the residues or the presence of pathogenic microorganisms. The decomposition of toxic compounds like cyanide or ammonia is not problematic. Furthermore, the present process produces ashes that are inorganic, inert and sterile that may represent worthy by-products. In the treatment of organic sludges of biological origin, the ashes produced can be used in fertilisers compositions because they may contain nitrates, phosphates, and other inorganic compounds.

It is also possible to destroy polyhalogenated hydrocarbons with fixation of halogens because of the high local temperatures available through the electrical plasma and the presence of alkaline ashes in the solids. Additives may be added in the firnace during the treatment, and is recommended to fix toxic products. Halogen fixation is generally accomplished by adding oxides, hydroxides or carbonates of alkaline metals or akaline-earth metals. Fixation of heavy metals is accomplished by adding phosphoric acid or phosphates and/or carbonates of alkaline metals or alkaline-earth metals, while hexavalent chromium is fixed by adding ferrous sulphates.

In the preferred embodiments of the invention, the temperature of the side walls of the furnace is maintained between 300 and 900° C. during step b), and preferably at about 500° C. A minimum temperature of 300° C. is required to ensure a spontaneous oxidation reaction of the organic matter contained in the residues. At 500° C., the solids do not melt, there is no fritting, nor eutectic formation with the refractory materials. However, some fine solids may agglomerate because of the mechanical action of the rotation of the furnace, which is desirable to avoid the evacuation of dust through the gases formed during step b), and ensures good fluidity of the thermo-transfer agent.

Step b) is generally performed at ambient pressure, which is about 100 kPa. It is however possible to operate at pressures varying from 30 to 600 kPa.

Preferably, the furnace has a size and geometry creating an internal volume allowing residence time of the gases of at least 1 second so that the oxidation reaction is complete inside the furnace. If the residues contain inorganic matter, the residence time of the residual inorganic matter (ashes) is generally higher than that of the gases so that adequate heat transfer is provided between the ashes generated and the residues freshly introduced, and to allow the ashes to accumulate inside the furnace to form the thermo-transfer agent. The filling level of the coolant in the furnace preferably corresponds to 15% of the total internal volume.

The term "thermo-transfer agent" as used herein refers to a solid and granulous inorganic material comprising particles having a diameter greater than 10 $\mu$m. It is used to make the heat of the refractory lining of the rotary furnace uniform through contact between the particles and the lining. It also quickly transfers the energy of the furnace to the humid residues introduced in the furnace, by admixture therewith. The thermo-transfer agent comes from the inorganic material contained in the residues to be treated which are deposited as ashes, and agglomerates, and/or can be introduced in the furnace if the residues do not contain inorganic matter or how a low concentration thereof. Examples of thermo-transfer agents that can be introduced in the furnace comprise sand, alumina particles, ground ceramics, etc.

Preferably, a furnace having a treatment capacity of at least 50 kg/h and a tangential speed of rotation of at least 0.01 m/s at the inner side wall of the furnace, but inferior to the speed of centrifugation of the furnace. Such a tangential speed of rotation allows the fluidization of the thermo-transfer agent, its mixture with freshly introduced residues and heat transfer between the refractory lining and the thermo-transfer agent.

The process of the invention is particularly useful for treating humid residues having a dryness or dry matter content comprised between 10 and 65% by weight, based on the total weight of the humid residues, and containing up to 70% by weight of organic matter, based on the total weight of dry organic and inorganic matters. The use of such residues makes possible its treatment in self-heating conditions.

Humid residues having a dryness higher than 35% by weight can be treated conventionally in an incinerator. Humid residues having a dry matter content lower than 10% by weight are too diluted and would be better treated by either a supercritical oxidation process, ozonation or other technologies for treating diluted aqueous effluents. At concentration of inorganic matters higher than 70% on a dry basis, the calorific power of the dry matter is too weak, and the dry matter content must therefore be significantly higher than 65% to insure self-heating conditions.

The process of the invention is useful for treating humid residues such as:
 a) waters highly toxic or containing a high concentration of pollutants, originating from industrial processes such as de-inking, textile, tanin, chemical industries, pulp and paper (secondary sludges and black liquor), etc.;
 b) sludges and liquid effluents generated in agro-food industry, such as animal excrements, effluents containing fats proteins, glucids, etc.;
 c) sludges from clarifyers used in wastewater treatment;
 d) sludges from biological treatment systems; and
 e) vegetable residues with a high water content, such as plant pulps like corn, soya and others.

Figure 2:
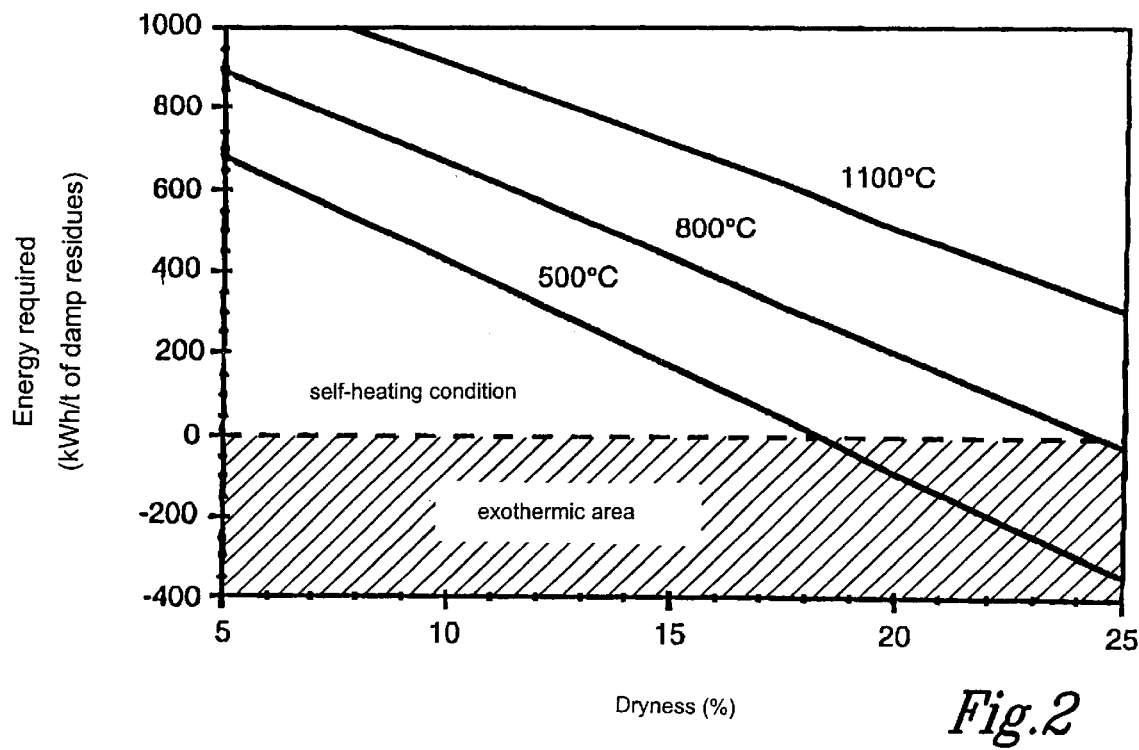
Figure 3:
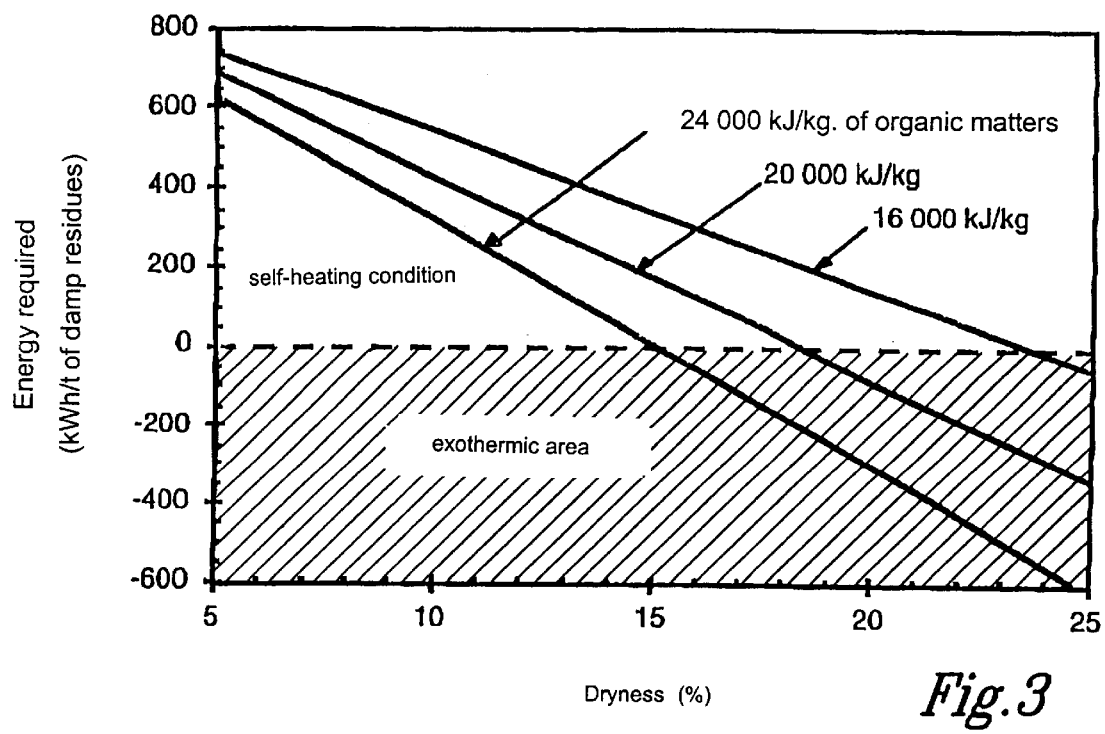

Other characteristics and advantages of the invention will become apparent after reading the description hereunder of preferred embodiments thereof, referring to the drawings, wherein:

FIG. 1 illustrates schematically an electrically catalysed oxidation reactor used for implementing a process according to the present invention;

FIG. 2 is a chart illustrating typical energy consumption versus dryness of humid residue (without ashes) to be treated, having calorific power of 20,000 kJ/kg of organic matters, under various internal sidewall furnace temperatures; and FIG. 3 is a chart illustrating typical energy consumption versus dryness or dry matter content of humid residues (without ashes) to be treated for various calorific power values of the organic matter contained in the humid residues, in the furnace at a temperature of 500° C.

The electrically catalysed oxidation reactor illustrated in FIG. 1 and designed as 10 comprises a rotary furnace 12 having a refractory lining 14 and rotary means (not shown). Humid residues to be treated and containing an organic load are introduced in firnace 12 through conduit 16, while air or oxygen required for oxidation of the organic load is introduced through conduit 18. Furnace 12 is heated with a plasma torch 20 generating chemically active species and a UV-type radiation catalysing the oxidation reaction. A plasmagene gas of oxygen, hydrogen, argon, nitrogen, methane, carbon monoxide, carbon dioxide or water vapour, or mixture thereof, is introduced through conduit 22. The plasmagene gas preferably comprises a fraction of the air required for oxidising the organic load, the remainder of air necessary being introduced through conduit 18. Air feed is reduced to a minimum to partially or completely oxidise the organic load, thus preventing undesirable loss of energy in the form of heat in a nitrogen excess caused by too much air. This also allows a reduction in the flow of gases generated in the reactor, thus helping in optimising the residence time of the gases in the reactor, which must be at least 1 second. It is suggested to use a slight excess of air of 10% by volume versus the minimum air requirement to oxidise the organic load to insure an improved reactivity between the oxidizable matter and oxygen. Nitrogen oxide that can be produced by plasma torch 20 is destroyed by the gaseous organic load since it is unstable in the presence thereof. Preferably, specific energy provided by the plasma torch is between 50 and 200 kWh/t of humid residues.

The process can be operated continuously. On one side, the humid residues and the oxidising gas are introduced in the furnace continuously to maintain gaseous emissions and thermoflow constant. Ashes 24 accumulating in the furnace act as heat carrier between freshly introduced residues and the inner surface of lining 14 of the furnace; any excess bleeds out through conduit 26. It is also possible to operate the process on a semi-continuous basis by periodically interrupting the process to remove accumulated inorganic matters.

Water vapour and gases generated by the oxidation of the organic load are expelled through conduit 28. A cyclone 30 located at the exit of the gases captures the ashes entrained by the gases. A portion of the heat of exiting gases 32 can be recovered by a heat sink 34 to preheat residues to be treated as well as air to be used as fuel, and even for partially drying the residues, in order to improve the thermal efficiency of the process. Flying ashes, separated from the gases by cyclone 30, are expelled through conduit 36.

FIG. 2 illustrates the effect of temperature of furnace 12, when the organic matter does not contain ashes and possessed a calorific power of 20,000 kJ/kg on a dry basis. This figure shows that in the case of sufficiently concentrated residues (dryness higher than 10%), if the calorific power of the oxidizable material is sufficiently high, it is possible to reach a self heating regime, ultimately exothermic, for the oxidising reactor.

FIG. 3 illustrates the effect of the calorific power on dry matter, with 0% ashes and a treatment temperature of 500° C. This figure shows that to approach or reach self-heating conditions, ultimately exothermic, the critical dryness depends on the calorific power of the organic matter.

It should be noted that FIGS. 2 and 3 are not taking into account the possible recovery of energy from hot gases expelled from the furnace, which would lower the critical dryness for reaching self-heating conditions.

While the invention has been described in connection with specific embodiments thereof, it will be understood that it is capable of farther modifications and this application is intended to cover any variations, uses or adaptations of the invention following, in general, the principles of the invention and including such departures from the present description as come within known or customary practice within the art to which the invention pertains, and as may be applied to the essential features hereinbefore set forth, and as follows in the scope of the appended claims.

What is claimed is:

1. Process for treating humid residues containing oxidizable organic matter and having a dry matter content of at least 10% by weight, based on the total weight of the humid residues, comprising the steps of:
   a) introducing said residues into a rotary furnace having a refractory lining and containing a thermo-transfer agent comprising solid and granulous inorganic particles;
   b) heating said residues in admixture with said thermo-transfer agent in the presence of chemically active species and UV radiation generated electrically, while rotating the furnace, so as to dry said residues without melting said residues and said thermo-transfer agent and cause oxidation of the organic matter and formation of gases, the oxidation being catalysed by the chemically active species and the UV radiation; and
   c) expelling the gases from the furnace.

2. Process according to claim 1, wherein step (b) is performed at a furnace sidewall temperature of about 500° C.

3. Process according to claim 1, wherein step (b) is performed at an absolute pressure between about 30 and about 600 kPa.

4. Process according to claim 3, wherein step (b) is performed at an absolute pressure of about 100 kPa.

5. Process according to claim 1, wherein the furnace has a size and a geometry creating an internal volume allowing a residence time of the gases of at least 1 second.

6. Process according to claim 1, wherein the residues comprise inorganic matter, and wherein the furnace has a geometry allowing a residence time of residual inorganic matter of at least 1 second.

7. Process according to claim 1, wherein the furnace has an inner sidewall and rotates to generate a tangential speed at the inner sidewall of at least 0.01 m/s, and wherein the furnace has a treatment capacity of at least 50 kg/h.

8. Process according to claim 1, wherein step (b) is carried out with a plasma torch.

9. Process according to claim 8, wherein the plasma torch comprises a plasmagene gas selected from the group consisting of oxygen, hydrogen, argon, nitrogen, methane, carbon monoxide, carbon dioxide, water vapor and mixtures thereof.

10. Process according to claim 1, wherein step (b) is carried out with an electric arc or electric discharge system between two metallic or graphite electrodes.

11. Process according to claim 1, wherein the residues have a dry matter content comprised between 10 and 65% by weight, based on the total weight of the humid residues, and contain inorganic matter in an amount of up to 70% by weight, based on the total weight of dry organic and inorganic matters.

12. Process according to claim 1, wherein the residues have a dry matter content higher than 65% by weight, based on the total weight of the humid residues, and contain inorganic matter in an amount higher than 70% by weight, based on the total weight of dry organic and inorganic matters.

13. Process according to claim 1, wherein the residues contain a toxic product and wherein before step (a), a chemical compound is added to the residues for fixing said toxic product.

14. Process according to claim 13, wherein said chemical compound is selected from the group consisting of phosphoric acid, ferrous sulphate, oxides, hydroxides, carbonates and phosphates of alkaline metals or alkaline earth-metals.

15. Process according to claim 1, wherein the residues are sludges or liquid effluents which are highly toxic or comprise high pollutants concentrations, produced from an industrial process.

16. Process according to claim 1, wherein the residues are sludges and liquid effluents generated in agro-food industry.

17. Process according to claim 1, wherein the residues are sludges from a clarifier used in wastewater treatment.

18. Process according to claim 1, wherein the residues are sludges from a biological treatment system.

19. Process according to claim 1, wherein the residues have a high concentration of water.

20. Process for treating humid residues containing oxidizable organic matter having a calorific value, comprising the steps of:
   a) introducing said residues into a rotary furnace having a refractory lining and containing a thermo-transfer agent comprising solid and granulous inorganic particles;
   b) heating said residues in admixture with said thermo-transfer agent at a temperature of at least 300° C. in the presence of chemically active species and UV radiation generated electrically, while rotating the furnace, utilizing the calorific value of the organic matter being treated to dry said residues and cause oxidation of the organic matter and formation of gases, the oxidation being catalyzed by the chemically active species and the UV radiation; and
   c) expelling the gases from the furnace.

21. Process according to claim 20, wherein step b) is performed at a temperature between about 300 and about 900° C.

22. Process according to claim 21, wherein step b) is performed at a furnace sidewall temperature of about 500° C.

23. Process according to claim 20, wherein step b) is performed at an absolute pressure between about 30 and about 600 kPa.

24. Process according to claim 23, wherein step b) is performed at an absolute pressure of about 100 kPa.

25. Process according to claim 20, wherein the furnace has a size and a geometry creating an internal volume allowing a residence time of the gases of at least 1 second.

26. Process according to claim 20, wherein the residues comprise inorganic matter, and wherein the furnace has a geometry allowing residence time of residual inorganic matter of at least 1 second.

27. Process according to claim 20, wherein the furnace has an inner sidewall and rotates to generate a tangential speed at the inner sidewall of at least 0.01 m/s, and wherein the furnace has a treatment capacity of at least 50 kg/h.

28. Process according to claim 20, wherein step b) is carried out with a plasma torch.

29. Process according to claim 28, wherein the plasma torch comprises a plasmagene gas selected from the group consisting of oxygen, hydrogen, argon, nitrogen, methane, carbon monoxide, carbon dioxide, water vapor and mixtures thereof.

30. Process according to claim 20, wherein step b) is carried out with electric arc or electric discharge system between two metallic or graphite electrodes.

31. Process according to claim 20, wherein the residues have a dry matter content comprising between 10 and 65% by weight based on the total weight of humid residues, and contain inorganic matter in an amount of up to 70% by weight, based on the total weight of dried organic and inorganic matters.

32. Process according to claim 20, wherein the residues have a dry matter content higher than 65% by weight, based on the total weight of the humid residues, and contain inorganic matter in an amount higher than 70% by weight, based on total weight of dried organic and inorganic matters.

33. Process according to claim 20, wherein the residues contain a toxic product and wherein before step a), a chemical compound is added to the residues for fixing said toxic product.

34. Process according to claim 33, wherein said chemical compound is selected from the group consisting of phosphoric acid, ferrous sulfate, oxides, hydroxides, carbonates and phosphates of alkaline metals or alkaline earth metals.

35. Process according to claim 20, wherein the residues are sludges or liquid effluents which are highly toxic or comprise high pollutants concentrations, produced from an industrial process.

36. Process according to claim 20, wherein the residues are sludges and liquid effluents generated in an agro-food industry.

37. Process according to claim 20, wherein the residues are sludges from a clarifier used in wastewater treatment.

38. Process according to claim 20, wherein the residues are sludges from a biological treatment system.

39. Process according to claim 20, wherein the residues have a high concentration of water.

40. Process for treating humid residues containing oxidizable organic matter having a calorific value and having a dry matter content of at least 10% by weight, based on the total weight of the humid residues, comprising the steps of:
   a) introducing said residues into a rotary furnace having a refractory lining and containing a thermo-transfer agent comprising solid and granulous inorganic particles;
   b) heating said residues in admixture with said thermo-transfer agent in the presence of chemically active species and UV radiation generated electrically, while rotating the furnace, utilizing the calorific value of the organic matter being treated to dry said residues without melting said residues and said thermo-transfer agent and to cause oxidation of the organic matter and formation of gases, the oxidation being catalysed by the chemically active species and the UV radiation; and
   c) expelling the gases from the furnace, wherein the calorific value of the residues is high enough to allow the process to become self-heating.

* * * * *